United States Patent [19]
Stone et al.

[11] Patent Number: 5,982,997
[45] Date of Patent: Nov. 9, 1999

[54] DATA STREAM PROTOCOL FOR IMMEDIATE JOB SWITCHING

[75] Inventors: David E. Stone, Longmont; Reinhard H. Hohensee, Boulder; David J. Shields, Louisville, all of Colo.

[73] Assignee: International Business Machines Inc., Armonk, N.Y.

[21] Appl. No.: 08/911,103

[22] Filed: Aug. 14, 1997

[51] Int. Cl.[6] .......................... G06T 15/00; G05B 11/00
[52] U.S. Cl. .................. 395/114; 395/114; 395/112; 395/113
[58] Field of Search ..................... 395/112, 114, 395/774, 133, 445, 872, 117, 102, 113

[56] References Cited

U.S. PATENT DOCUMENTS

| | | | |
|---|---|---|---|
| 5,228,118 | 7/1993 | Sasaki | 395/112 |
| 5,267,047 | 11/1993 | Argenta et al. | 358/400 |
| 5,319,754 | 6/1994 | Meinecke et al. | 395/325 |
| 5,367,643 | 11/1994 | Chang et al. | 395/325 |
| 5,469,545 | 11/1995 | Vanbuskirk et al. | 395/200.01 |
| 5,504,928 | 4/1996 | Cook et al. | 395/882 |
| 5,537,550 | 7/1996 | Russell et al. | 395/200.11 |
| 5,537,626 | 7/1996 | Kraslavsky et al. | 395/828 |
| 5,592,683 | 1/1997 | Chen et al. | 395/872 |
| 5,727,220 | 3/1998 | Hohensee et al. | 395/774 |
| 5,768,488 | 6/1998 | Stone et al. | 395/117 |

OTHER PUBLICATIONS

L.R. Imhoff, S.K. Makinen, D.L. Simonson and W.W. Wrolson, "Automated Synchronization of Intelligent Printer Data Stream Printer Asyncronous Negative Acknowledgements with a Test Script," *IBM Technical Disclosure Bulletin*, vol. 30 No. 11, Apr. 1988, pp. 60–65.

Disclosed anonymously, "Multiple Device Addressing with a Single Host Address," *Research Disclosure*, 33167, Nov. 1991, p. 882.

W. Chen and D. Stone, "Intelligent Printer Data Stream Buffered Command and Page Pipeline Notations," *IBM Technical Disclosure Bulletin*, vol. 36 No. 03, Mar. 1993, pp. 157–158.

W. Chen, M.A. Nelsen and David. E. Stone, "Automated Synchronization of Intelligent Printer Data Stream Printer Asyncronous Negative Acknowledgements with a Test Script," *IBM Technical Disclosure Bulletin*, vol. 38 No. 30, Mar. 1995, pp. 191–193.

*Primary Examiner*—Scott Rogers
*Assistant Examiner*—Douglas Q. Tran
*Attorney, Agent, or Firm*—Charles E. Rohrer

[57] ABSTRACT

A printing system wherein a first print driver utilizes an Intelligent Printer Data Stream (IPDS) to send a first job at a first font resolution to a printer and a second job at a second font resolution or a second job utilizing a non-IPDS data stream to the printer. A second print driver also utilizing the IPDS data stream is connected to the same printer for sending a third job. By sending a "Manage IPDS Dialog (MID)" IPDS command to the printer upon conclusion of the first job, the printer is enabled to switch immediately to the second job. The printer is enabled to switch between the first and second print drivers by use of the MID command at the conclusion of a print job.

24 Claims, 2 Drawing Sheets

DATA STREAM PROTOCOL FOR IMMEDIATE JOB SWITCHING

This invention relates to a system and method enabling a printer to switch immediately to a second job upon the conclusion of a first job where the first job utilizes a bi-directional data stream such as an Intelligent Printer Data Stream (IPDS) and where the second job is either a non-IPDS data stream or utilizes another print driver.

CROSS-REFERENCE TO RELATED PATENT APPLICATION

IBM docket BO9-96-019, relates to an object container for encapsulating non-IPDS page description data streams within an IPDS data stream.

BACKGROUND OF THE INVENTION

The Intelligent Printer Data Stream (IPDS) architecture provides a structured field data stream that manages printer processes in a bi-directional manner that is independent of the communication means and the transmission protocol. Both IPDS commands and page description data are packaged in the data field of the transmission protocol and sent to the printer; the printer is enabled to respond with appropriate acknowledgements thereby enabling error recovery, resource management and print job auditing. U.S. Pat. No. 4,651,278 incorporated herein by reference, describes the printer interface process known commercially as IPDS. Reference may also be made to the manual "IPDS Reference," S 544–3417, Data Stream and Object Architecture Library, available from the International Business Machines Corporation.

The Intelligent Printer Data Stream (IPDS) is used to provide print jobs to a printer from a print driver that utilizes the IBM Print Services Facility (PSF). Historically, the Print Services Facility has sent large production print jobs that have been provided to it from a mainframe and spooled. As a consequence, the typical system included one print source, one print driver and one printer. With the advance of computer technology, PSF is now used for print jobs originating on mid-sized computers such as an IBM AS400, or workstations such as an IBM RISC6000 and on personal computers. As a result more than one PSF print driver is sometimes now connected to the same printer. Also, there can be print drivers other than PSF present in a system and connected to the same printer. For example, a system might have a PSF print driver, a PostScript print driver and a Printer Control Language (PCL) print driver all connected to the same printer. Additionally, the PSF print driver may be able to send not only an IPDS data stream but may be capable of sending non-IPDS such as a PostScript data stream and a PCL data stream to the same printer. The various data streams have particular logical sockets at the printer to which they are connected.

When a non-IPDS data stream from a non-IPDS print driver is connected to a printer together with an IPDS data stream from a PSF print driver, it was discovered that problems could occur in the interleaving of IPDS print jobs with non-IPDS print jobs, that is, the pages in the stacker were mixed between more than one print job. This occurred because, unlike the historical configuration, the Print Services Facility did not have sole control over the printer. With more than one print driver connected to the printer, given the right combination of time-out values and delay in sending data to the printer (such as when the computer on which PSF is running becomes very busy or when PSF is processing a complex data stream) the printer inactivity timer could time-out and switch to a different socket for the printing of a job present at that socket. The problem was solved by utilizing the bi-directional nature of the IPDS architecture, that is, the IPDS architecture provides for the printer to "speak" to the print driver as well as receive a data stream from the print driver. Thus, an IPDS command, the "Manage IPDS Dialog (MID)" command, was added to the IPDS command structure in order to provide a code signaling the start of an IPDS dialog and a second code signaling the end of an IPDS dialog. The command included an exception code through which the printer could request the print driver to end the IPDS dialog. That action would be taken, for example, when the printer receives a request to print from another session, for example, PostScript. In that manner, PSF is alerted to the fact that the printer has other work to do thereby enabling PSF to break the IPDS data stream at an appropriate point such as at the conclusion of the current print job in order to allow the printer to print from a job request received from a different print driver. In that manner, the IPDS job is not interrupted until it is finished and there is no interleaving of the IPDS job with a non-IPDS job in the print stacker. This feature prevents the interleaving of jobs and also enables the user to print a short job between IPDS print jobs which are often long production runs.

When the printer switches from the IPDS dialog, it saves the IPDS state (IPDS is a state machine) and unless resources allocated to IPDS are needed to service the non-IPDS job, the IPDS state is retained. Should the printer need resources which have been previously allocated to IPDS, those resources are freed in order to do the non-IPDS print job. When returning to IPDS, the first IPDS command received by the printer results in the printer flowing a NACK (Negative Acknowledgement) to PSF, informing PSF that it is necessary to reinitialize the session to establish the resources needed to continue printing IPDS jobs.

In the past when a PSF print driver was requested to send a PostScript data stream, a PCL data stream, or some other non-IPDS data stream to a printer, the print driver would first rasterize the non-IPDS data stream into page images which were then sent with an IPDS data stream. This has advantages since the IPDS data stream implements a bi-directional architecture thereby enabling the printer to send acknowledgements to the print driver and allowing sophisticated error recovery, resource management, and print job auditing. However, if the printer has the capability of rasterizing the non-IPDS data stream, it is considerably more efficient to send the non-IPDS data stream directly to the printer. To do that, however, the printer had to time out before it could switch to processing the non-IPDS job. After timing out it could then service a job present on a different socket presenting a different data stream. Also, in a configuration where more than one PSF print driver is present, different IPDS data streams can be sent to the same printer This case also required a printer time-out before the switch could be made from one IPDS print driver to another.

SUMMARY OF THE INVENTION

In this invention a PSF print driver, connected to a first port on a printer, sends a "Manage IPDS Dialog (MID)"— End Dialog command to the printer to signal the printer that it can switch to a different non-IPDS socket for another job sent by the same print driver, or to a different PSF print driver for another IPDS job. In that fashion, the printer can switch immediately to another print job and does not need to wait for a printer timeout before processing the second job. When the switch is made, the IPDS dialog ends but the logical protocol session supporting IPDS dialog at the first port continues while the second job is performed. Thus, as long as resources were not reallocated during processing of the second job, the IPDS dialog can resume at the end of the second job without the overhead of reinitialization.

The above mentioned and other features and objects of this invention and the manner of obtaining them will become more apparent, and the invention itself will best be understood by reference to the following description of embodiments of the invention taken in conjunction with the accompanying drawing, a description of which follows.

DETAILED DESCRIPTION

In all current printer configurations it is necessary to have a physical connection between the print driver and the printer in order to carry the signals to the printer. Some examples of a physical connection include the Ethernet, the IBM token ring, a channel, a serial attachment or a parallel port. Whatever the link, it is terminated at a port on the control unit of the printer.

On top of the physical wires to carry the signals, there is also a logical protocol. Some examples of logical protocol include System Network Architecture (SNA), the system 370 channel and the Transmission Control Protocol/Internet Protocol (TCP/IP). Carried within the logical protocol is the data stream which can be IPDS or PostScript, for example. Thus, the requirements are a physical link, a logical protocol understood by both the print driver and the printer control unit and a data stream to carry the actual print data.

Figure 1:
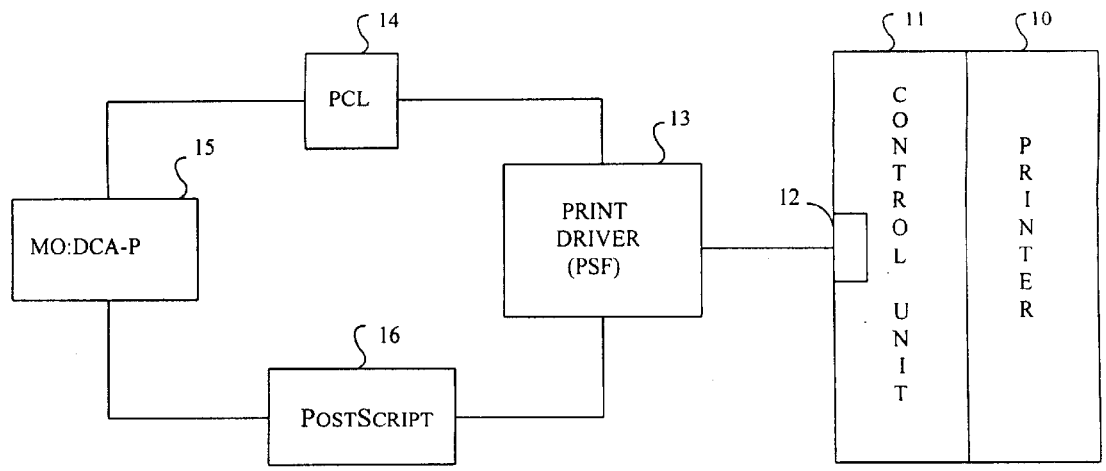
FIG. 1 illustrates a network configuration utilizing this invention wherein a PSF print driver can send more than one data stream to a printer.

FIG. 1 shows a printer 10 with a control unit 11 having a port 12 connected to a PSF print driver 13. The print driver 13 is connected in a network wherein a workstation 14 is able to provide a PCL data stream, a workstation 15 is able to provide a MO:DCA-P, Mixed Object Document Content Architecture data stream and a workstation 16 which is able to provide a PostScript data stream. It should be noted that PostScript, MO:DCA-P, and PCL are all page description languages which provide commands to describe the page and its content. Also, PostScript and PCL are data streams provided directly to a printer, whereas a MO:DCA data stream is converted to an IPDS data stream by the PSF print driver 13.

Currently, in the configuration of FIG. 1, print driver 13 also converts non-MO:DCA data streams such as Postscript and PCL into page images for presentation by IPDS to the printer 10. In order to do that the PCL page, for example, is rasterized so that the page image is sent with IPDS commands from PSF to the printer. In that manner, there is no need for PSF to end the logical protocol session supporting the IPDS transmission in order to send the non-IPDS job. However, that approach necessitates the transfer of a very large amount of data from PSF to the printer. If the printer has the capability of rasterizing PCL, for example, and producing the page image, it would be simpler and faster to transfer the PCL data stream directly to the printer, that is to say, transfer page-building commands rather than the page image. If PSF could send the PCL directly, while the transmission would go to a different socket, there would be no need to end the IPDS session and create the need for reinitializing before the next IPDS job is sent to the printer.

In the case of PostScript, which often describes graphics information, it can take a large amount of time to interpret the PostScript data stream and produce the page images, and while PSF is required to do PostScript interpretation it is not driving the printer. Consequently, it can be more efficient to send the PostScript data stream directly to the printer where an interpreter already exists.

The invention enables more efficient transfer by providing an orderly way for PSF to move from transmitting an IPDS data stream to a non-IPDS data stream such as PostScript or PCL. With this invention, when PSF ends the IPDS job, it sends the MID command signaling the printer that the IPDS is finished thereby allowing the printer to immediately look for and process a next job on the PostScript socket, for example, and do a PostScript job. When the PostScript job is ended, then the IPDS transmission can pick up again and unless resources had to be reallocated, there would be no need to reinitialize the IPDS state. Thus, the MID command becomes an efficient way for PSF to send different data streams to the same printer. Two advantages accrue from the use of the MID command, the printer is enabled to switch to the non-IPDS socket without delay and the PSF is enabled to resume the IPDS session without reinitializing the IPDS state as long as the non-IPDS job did not require printer resources previously allocated to the IPDS state machine.

Figure 2:
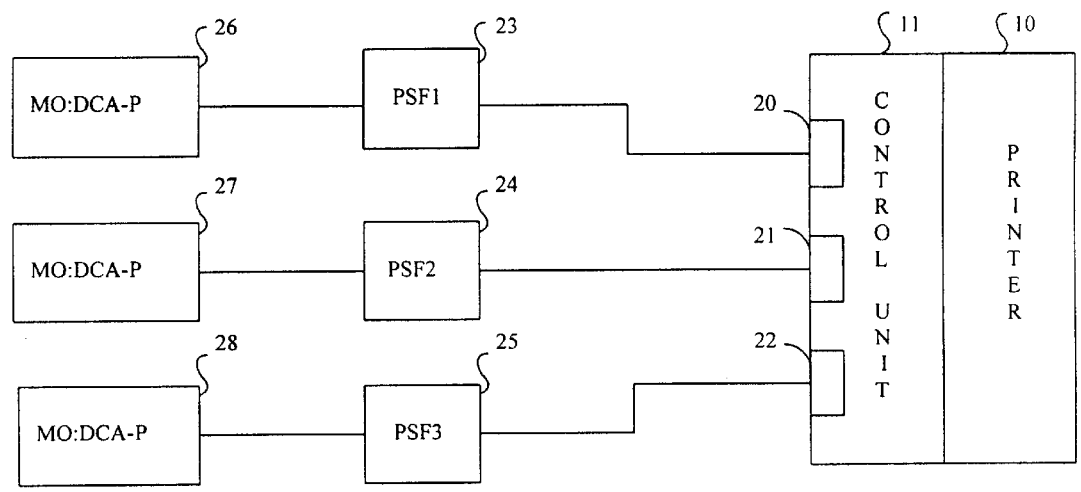
FIG. 2 shows a configuration utilizing this invention wherein more that one PSF print driver is connected to one printer.

FIG. 2 illustrates a second configuration in which the current invention is useful. In this configuration, a printer 10 with a control unit 11 contains a port 20 connected to a first PSF print driver 23. Control unit 11 has a second port 21 connected to a second PSF print driver 24 and a third port 22 connected to a third PSF print driver 25. Print driver 23 receives MO:DCA print jobs from print source 26, print driver 24 receives MO:DCA print jobs from print source 27 and print driver 25 receives MO:DCA print jobs from print source 28. The configuration shown in FIG. 2 has not been used in the past, since essentially it is comprised of three masters, print drivers 23, 24 and 25, all utilizing the same slave printer 10. This configuration would require three IPDS state machines in printer 10. With the use of the MID command, however, an orderly system is devised enabling the printer 10 to switch from one master to another for the processing of different IPDS jobs from different PSF print drivers. Thus, when a job is finished from print driver 23, a MID command can be issued allowing the printer 10 to service a print job request from print driver 24. As long as no printer resources allocated to print driver 23 are used to service the request from print driver 24, a return can be made to print driver 23 to service another job without reinitializing the IPDS state. Thus, multiple IPDS sessions can be handled by one printer in an orderly manner. NACK (Negative Acknowledgement) responses are flowed from the printer to alert a print driver when resources that had been previously allocated to that print driver have been deactivated by the printer in the performance of a job for another print driver. In that manner, the first print driver is made aware of the need to reinitialize before it commences the next job.

A variation is where the printer is capable of handling IPDS jobs with 240 pel fonts and also capable of handling IPDS jobs with 300 pel fonts. With this invention, PSF can switch back and forth from jobs oriented to the 240 pel fonts to jobs oriented to the 300 pel fonts without reinitializing. Currently, in that situation two copies of PSF are needed, one to handle 300 pel jobs and the other to handle 240 pel jobs. With this invention, it is possible to switch back and forth and utilize the same software for driving the printer. This invention would also be used to switch back and forth between two copies of PSF where one is hooked up to drive the 240 pel font and the other one the 300 pel font. Basically, the invention provides an orderly way to end the dialog of one job and switch to the dialog of another job where the other job is either a different data stream or a different resolution font.

Figure 3:
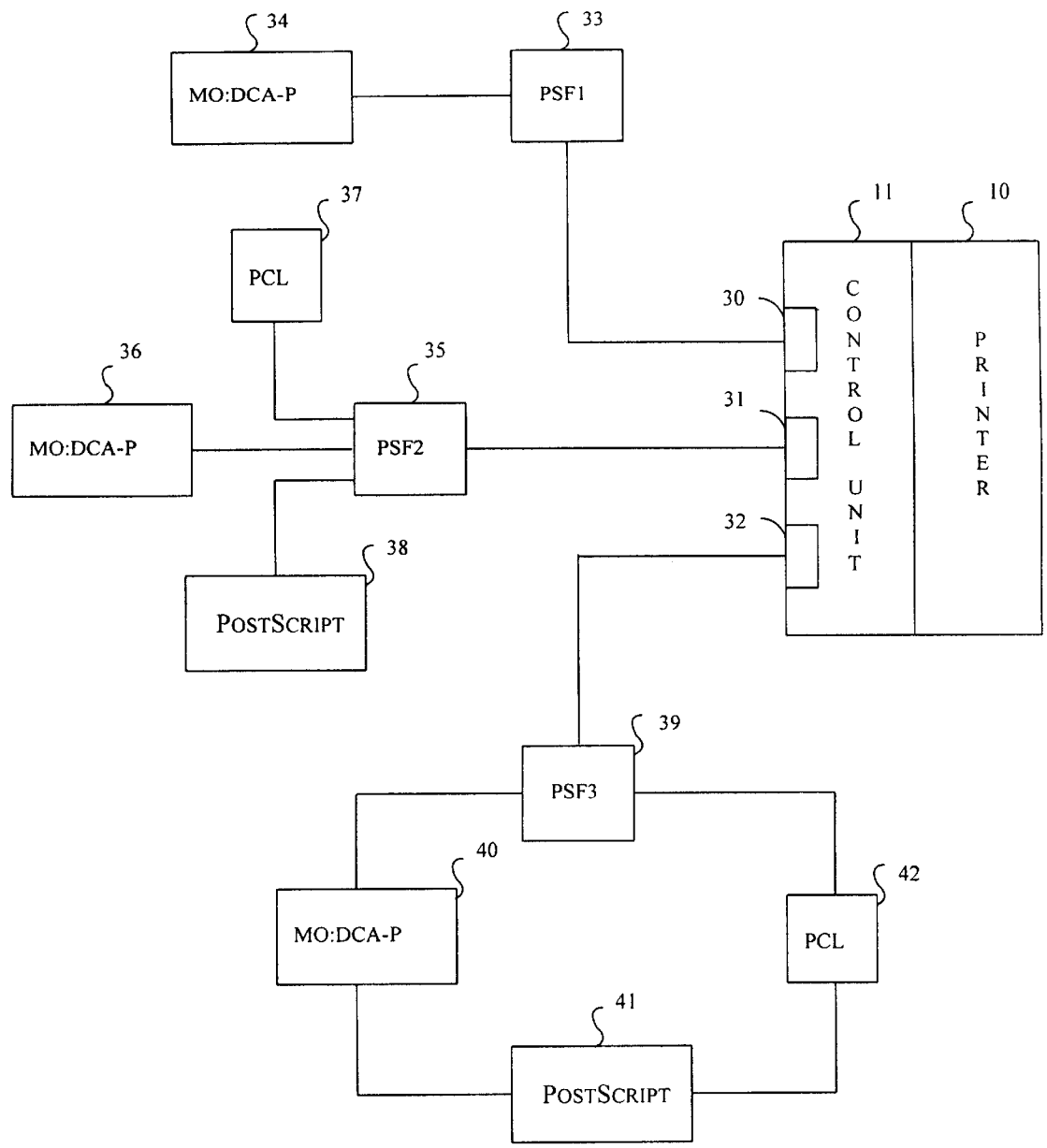
FIG. 3 shows a complex system combining the configurations of FIGS. 1 and 2.

FIG. 3 illustrates the complexities of systems enabled by the current invention. In FIG. 3 a printer 10 with a control unit 11 has a first port 30 connected to print driver 33. Print driver 33 produces an IPDS data stream from print jobs originating with MO:DCA-P print source 34. Control unit 11 has a second port 31 connected to print driver 35 which produces multiple data streams such as the IPDS data stream built from the MO:DCA-P data stream provided from print source 36, a PCL data stream from print source 37 and a PostScript data stream from print source 38. Similarly, print driver 39 is connected in a network to provide an IPDS data stream from print source 40, a PostScript data stream from print source 41 and a PCL data stream from print source 42. Through the use of the MID command, the various acknowledgement exception codes, and the NACK response, the printer 10 can service jobs from all of the various print drivers, regardless of the data stream utilized in an orderly manner and is enabled to switch immediately from one print job to another.

Any IPDS command can be used to start an IPDS dialog. If an IPDS dialog has been started and a subsequent MID command with a "start IPDS dialog" value is received by the printer, the MID command is treated like a no operation (NOP) command Likewise, if a MID command with an "end IPDS dialog" value is received as the first command of an IPDS dialog, the MID command is treated like a NOP command.

If the Acknowledgement Required (ARQ) flag in the MID command to end a dialog is set to B'1', the IPDS dialog does not end until a positive acknowledge reply has been sent by the printer. If a NACK is sent in response to a MID command, the state of the IPDS dialog is not changed.

When an IPDS dialog is ended, but the carrying-protocol session remains active, the printer will normally maintain unchanged the IPDS state machine and all IPDS resources so that when a subsequent IPDS command is received, the IPDS dialog can continue as if it had not been interrupted at all. If the printer does change any portion of the IPDS state machine or resource information after an IPDS dialog is ended, the printer must issue an appropriate action code X'1D' NACK or exception ID X'0100. .00' (normal printer restart) when the next IPDS command is received.

A printer can request the presentation services program to end the current IPDS dialog by issuing exception ID X'0180. .00'—Request to end IPDS dialog.

| Length | X'D601' | Flag | CID | Data |
|--------|---------|------|-----|------|

The format of the data field for the MID command is as follows:

| Offset | Type | Name | Range | Meaning | Required |
|--------|------|------|-------|---------|----------|
| 0 | CODE | Type | X'00' | Start IPDS dialog | X'00' |
|   |      |      | X'01' | End IPDS dialog | X'01' |

Bytes 0 Type

This byte specifies either to start or to stop an IPDS dialog. If an invalid value is specified, exception ID X'025B. .01' exists.

Exception IDs
X'0100. .00' Normal Printer Restart
Action code: X'0D'
Explanation: One or more of the following conditions occurred:
  The printer was Initial Microcode Loaded (IMLed) in a normal manner.
  The printer was switched from Offline to Online State.
  The channel issued a System$_{13}$ Reset (applies only to channel-attached printers.)
  The channel issued a Selective_Reset (applies only to channel-attached printers.)
  An IPDS dialog ended and the printer reset the IPDS state machine and deleted all resources. This occurs when an IPDS dialog ends and the printer needs to use some of the resources, such as storage, that had been allocated to the IPDS dialog.
Support Optional
X'0180. .00' Request to end IPDS dialog
Action code: X'05'
Explanation: The printer has received a request to print from another session and asks the presentation services program to end the current IPDS dialog as soon as possible, such as at the end of the current print unit.
Support: Optional
X'025B. .01' Invalid type value in a MID command
Action code: X'01'
Explanation: The type parameter in a Manage IPDS Dialog command contained an invalid value.
Support: Mandatory While the invention has been shown and described with reference to preferred embodiments thereof, it should be understood that changes in the form and details of the invention may be made therein without departing from the spirit and scope of the invention. For example, in the above description of the invention, the IPDS architecture was described as providing a structured field data stream for managing printer processes in a bi-directional manner that is independent of the physical connection and the logical protocol. In the following claims, the term IPDS should be understood as including any data stream with the characteristics of IPDS. The term non-IPDS data stream should be understood as a data stream which lacks one or more of those characteristics.

What is claimed is:
1. A data processing system comprising
   printer;
   a print driver capable of utilizing an Intelligent Printer Data Stream (IPDS) to establish a first dialog with said printer to send print jobs to said printer and capable of utilizing a non-IPDS data stream to establish a non-IPDS second dialog to send a non-IPDS print job to said printer; and
   an IPDS command utilized in said first dialog by said print driver at the conclusion of a print job to enable said printer to switch immediately to the processing of the non-IPDS dialog while maintaining the logical protocol session supporting said first dialog.

2. The system of claim 1 wherein said IPDS command is the Manage IPDS Dialog (MID) command.

3. The system of claim 2 wherein said print driver is the Print Services Facility (PSF).

4. A data processing system comprising a printer;

a first print driver connected to said printer, said first print driver capable of utilizing an Intelligent Printer Data Stream (IPDS) to establish a first dialog to send print jobs to said printer;

a second print driver connected to said printer, said second print driver capable of utilizing an IPDS data stream to establish a second dialog to send print jobs to said printer; and an IPDS command utilized in the first and second dialogs by both said first print driver and said second print driver at the conclusion of a print job to signal said printer to switch immediately to the processing of jobs within the dialog established by the other print driver while maintaining each of the logical protocol sessions supporting the first and second dialogs.

5. The system of claim 4 wherein said IPDS command is the Manage IPDS Dialog (MID) command.

6. The system of claim 5 wherein said first print driver and said second print driver both are the Print Services Facility (PSF).

7. A data processing system comprising a printer;

a first print driver connected to said printer, said first print driver capable of utilizing an Intelligent Printer Data Stream (IPDS) to establish a first dialog with said printer to send print jobs to said printer and capable of utilizing a non-IPDS data stream to establish a second non-IPDS dialog with said printer to send a print job to said printer;

an IPDS command utilized in said first dialog by said first print driver at the conclusion of a print job to enable said printer to switch immediately to the processing of the non-IPDS dialog while maintaining the logical protocol session supporting said first dialog;

a second print driver connected to said printer, said second print driver capable of utilizing said IPDS data stream to establish a third dialog with said printer to send print jobs to said printer;

said first print driver capable of utilizing said IPDS command at the conclusion of a print job in said first dialog to enable said printer to switch immediately to the processing of a print job in said third dialog while maintaining the logical protocol session supporting said first dialog; and said second print driver capable of utilizing said IPDS command at the conclusion of a print job in said third dialog to enable said printer to switch immediately to the processing of a print job in either said first dialog or said second dialog while maintaining the logical protocol session supporting said third dialog.

8. The system of claim 7 wherein said IPDS command is the Manage IPDS Dialog (MID) command.

9. The system of claim 8 wherein said print drivers are both Print Services Facility (PSF).

10. The system of claim 1 wherein said first dialog is capable of resumption without reinitialization unless printer resources needed for said first dialog were reallocated to said second dialog, in which case said printer is capable of utilizing said IPDS command to send IPDS notification to said first dialog that reinitialization is needed.

11. A data processing system comprising a printer;

a print driver capable of utilizing an Intelligent Printer Data Stream (IPDS) to establish a first dialog with said printer to send print jobs to said printer and capable of utilizing said IPDS to establish a second dialog with said printer to send print jobs to said printer for printing at a different resolution from said first dialog; and an IPDS command utilized in both the first and second dialogs at the conclusion of a print job to switch immediately to the processing of jobs within the other dialog.

12. The system of claim 11 wherein said first dialog is capable of resumption without reinitialization unless printer resources needed for said first dialog were reallocated to said second dialog, in which case said printer is capable of utilizing said IPDS command to send IPDS notification to said first dialog that reinitialization is needed.

13. The system of claim 12 wherein said IPDS command is the Manage IPDS Dialog (MID) command.

14. The system of claim 13 wherein said print driver is the Print Services Facility (PSF).

15. The system of claim 1 wherein said first dialog is capable of resumption without reinitialization unless printer resources needed for said first dialog were reallocated to said second dialog, in which case said printer is capable of utilizing said IPDS command to send IPDS notification to said first dialog that reinitialization is needed.

16. The system of claim 7 wherein said first dialog is capable of resumption without reinitialization unless printer resources needed for said first dialog were reallocated to another dialog, in which case said printer is capable of utilizing said IPDS command to send IPDS notification to said first dialog that reinitialization is needed and wherein said third dialog is capable of resumption without reinitialization unless printer resources needed for said third dialog were reallocated to another dialog, in which case said printer is capable of utilizing said. IPDS command to send IPDS notification to said third dialog that reinitialization is needed.

17. A method of switching from an Intelligent Printer Data Stream (IPDS) dialog to a second dialog where said IPDS dialog is established between a print driver and a printer to enable the printing of a plurality of print jobs presented by said IPDS dialog to said printer; and where a second dialog is established between said print driver and said printer to enable the printing of at least one print job presented by said second dialog to said printer, said method comprising providing an IPDS command for use in said first IPDS dialog at the conclusion of a print job to enable said printer to switch immediately to the processing of said second dialog while maintaining the logical protocol session supporting said first dialog;

providing for the resumption of said first dialog without reinitialization unless printer resources needed for said first dialog were reallocated to said second dialog; and providing for IPDS notification of said IPDS dialog by said printer that reinitialization is needed if printer resources were reallocated.

18. The method of claim 17 wherein said second dialog is a non-IPDS dialog established by said print driver.

19. The method of claim 17 wherein said second dialog is a second IPDS dialog established by said print driver, and further including providing said IPDS command for use in said second IPDS dialog at the conclusion of a print job to enable said printer to switch immediately to the processing of said first dialog while maintaining the logical protocol session supporting said second IPDS dialog.

20. The method of claim 18 wherein a third dialog is established between a second print driver and said printer, said third dialog is a second IPDS dialog and wherein both said first dialog and said third dialog are enabled to use said IPDS command to switch immediately to the other dialog while maintaining the logical protocol session supporting itself.

21. An article of manufacture comprising a computer readable medium having embodied therein a method of switching from an Intelligent Printer Data Stream (IPDS) dialog to a second dialog where said IPDS dialog is established between a print driver and a printer to enable the printing of a plurality of print jobs presented by said IPDS dialog to said printer; and where a second dialog is established between said print driver and said printer to enable the printing of at least one print job presented by said second dialog to said printer, said method comprising providing an IPDS command for use in said first IPDS dialog at the conclusion of a print job to enable said printer to switch immediately to the processing of said second dialog while maintaining the logical protocol session supporting said first dialog;

providing for the resumption of said first dialog without reinitialization unless printer resources needed for said first dialog were reallocated to said second dialog; and providing for IPDS notification of said IPDS dialog by said printer that reinitialization is needed if printer resources were reallocated.

22. The article of manufacture of claim 21 wherein said second dialog is a non-IPDS dialog established by said print driver.

23. The article of manufacture of claim 21 wherein said second dialog is a second IPDS dialog established by said print driver, and further including providing said IPDS command for use in said second IPDS dialog at the conclusion of a print job to enable said printer to switch immediately to the processing of said first dialog while maintaining the logical protocol session supporting said second IPDS dialog.

24. The article of manufacture of claim 23 wherein a third dialog is established between a second print driver and said printer, said third dialog is a second IPDS dialog and wherein both said first dialog and said third dialog are enabled to use said IPDS command to switch immediately to the other dialog while maintaining the logical protocol session supporting itself.

* * * * *

UNITED STATES PATENT AND TRADEMARK OFFICE
CERTIFICATE OF CORRECTION

PATENT NO.   : 5,982,997
DATED        : November 9, 2000
INVENTOR(S)  : Stone et al.

It is certified that error appears in the above-identified patent and that said Letters Patent is hereby corrected as shown below:

Col. 7, line 4:  "1" should be --10--

Col. 7, line 26: "4" should be --15 --

Col. 8, line 26: "1" should be --4--

Signed and Sealed this

Tenth Day of April, 2001

Attest:

NICHOLAS P. GODICI

*Attesting Officer*    *Acting Director of the United States Patent and Trademark Office*